(12) United States Patent
Anderson (10) Patent No.: US 9,340,954 B2
(45) Date of Patent: May 17, 2016

(54) REGENERATIVE CIRCUIT FOR ARTICULATED JOINT

(71) Applicant: Deere & Company, Moline, IL (US)

(72) Inventor: Eric Richard Anderson, Galena, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/492,155

(22) Filed: Sep. 22, 2014

(65) Prior Publication Data

US 2016/0083933 A1 Mar. 24, 2016

(51) Int. Cl.
| B62D 12/00 | (2006.01) |
|---|---|
| E02F 9/22 | (2006.01) |
| F15B 11/024 | (2006.01) |
| F15B 21/14 | (2006.01) |
| E02F 9/08 | (2006.01) |
| E02F 9/20 | (2006.01) |

(52) U.S. Cl.
CPC ............ *E02F 9/2217* (2013.01); *E02F 9/0841* (2013.01); *E02F 9/2025* (2013.01); *F15B 11/024* (2013.01); *F15B 21/14* (2013.01); *F15B 2211/41* (2013.01); *F15B 2211/455* (2013.01); *F15B 2211/7107* (2013.01)

(58) Field of Classification Search
CPC ................. B62D 12/00; B62D 55/065; F15B 2211/7107
See application file for complete search history.

(56) References Cited

U.S. PATENT DOCUMENTS

| 3,081,647 A | 3/1963 | Blenkle | |
|---|---|---|---|
| 3,091,929 A | 6/1963 | Hipp | |
| 3,159,230 A * | 12/1964 | Gordon | B62D 12/00 180/420 |
| 4,016,949 A | 4/1977 | Plate et al. | |
| 4,023,646 A | 5/1977 | Heisig et al. | |
| 4,344,733 A * | 8/1982 | Hirsch | E02F 3/32 414/694 |
| 5,193,637 A * | 3/1993 | Lindblom | B62D 12/00 180/418 |
| 5,234,069 A * | 8/1993 | Krone | B62D 12/00 180/419 |
| 5,249,639 A * | 10/1993 | Marr | B62D 7/148 180/406 |
| 6,039,133 A * | 3/2000 | Zulu | B62D 11/183 180/403 |
| 6,382,075 B1 * | 5/2002 | Chiaramonte | B62D 5/061 91/399 |
| 8,061,466 B2 * | 11/2011 | Carlton | E02F 3/6481 172/125 |
| 2005/0139412 A1 * | 6/2005 | Vigholm | B62D 12/00 180/418 |
| 2006/0162988 A1 * | 7/2006 | Ivantysynova | B62D 12/00 180/418 |
| 2007/0246288 A1 * | 10/2007 | Mather | B62D 5/07 180/418 |
| 2012/0045281 A1 * | 2/2012 | Wagner | B62D 12/00 404/117 |
| 2013/0068544 A1 * | 3/2013 | Itou | B62D 11/003 180/6.5 |
| 2014/0306426 A1 * | 10/2014 | Guethle | B62D 12/00 280/442 |

* cited by examiner

*Primary Examiner* — Kevin Hurley
*Assistant Examiner* — Gabriela C Craciun (57) ABSTRACT

An articulated work vehicle with a regenerative hydraulic circuit may comprise a front chassis, a rear chassis, first and second hydraulic cylinders each with head and rod chambers and each pivotally connected to the front chassis and the rear chassis, and an articulation joint. The rod chamber of the second hydraulic cylinder may be hydraulically connected to the head chamber of the first hydraulic cylinder via a flow restrictor. The rod chamber of the second hydraulic cylinder may also be hydraulically connected to a hydraulic source via a check valve which is configured to allow hydraulic flow into the rod chamber of the second hydraulic cylinder. The articulation joint may pivotally connect the front chassis to the rear chassis. The articulation joint may be laterally positioned between the first hydraulic cylinder and the second hydraulic cylinder.

20 Claims, 4 Drawing Sheets

REGENERATIVE CIRCUIT FOR ARTICULATED JOINT

FIELD OF THE DISCLOSURE

The present disclosure relates to a machine. An embodiment of the present disclosure relates to a regenerative hydraulic circuit for an articulated joint of a work vehicle.

BACKGROUND

Several types of work vehicles may incorporate articulated frames. Examples of work vehicles which may incorporate articulated frames include articulated dump trucks, high speed dozers, motor graders, scrapers, skidders, tractors, wheel loaders, wheeled feller bunchers, and wheeled harvesters. These work vehicles may be articulated by the extension and refraction of hydraulic cylinders in a hydraulic circuit.

SUMMARY

According to an aspect of the present disclosure, an articulated work vehicle with a regenerative hydraulic circuit may comprise a front chassis, a rear chassis, a first hydraulic cylinder, a second hydraulic cylinder, and an articulation joint. The first hydraulic cylinder may comprise a head chamber and a rod chamber. The first hydraulic cylinder may be pivotally connected to the front chassis and pivotally connected to the rear chassis. The second hydraulic cylinder may comprise a head chamber and a rod chamber. The second hydraulic cylinder may be pivotally connected to the front chassis and pivotally connected to the rear chassis. The rod chamber of the second hydraulic cylinder may be hydraulically connected to the head chamber of the first hydraulic cylinder via a flow restrictor. The rod chamber of the second hydraulic cylinder may also be hydraulically connected to a hydraulic source via a check valve which is configured to allow hydraulic flow into the rod chamber of the second hydraulic cylinder. The articulation joint may pivotally connect the front chassis to the rear chassis. The articulation joint may be positioned between the first hydraulic cylinder and the second hydraulic cylinder.

According to another aspect of the present disclosure, the flow restrictor may be a first flow restrictor, the check valve may be a first check valve, the rod chamber of the first hydraulic cylinder may be hydraulically connected to the head chamber of the second hydraulic cylinder via a second flow restrictor, and the rod chamber of the first hydraulic cylinder may be hydraulically connected to the hydraulic source via a second check valve which is configured to allow hydraulic flow into the rod chamber of the first hydraulic cylinder.

According to another aspect of the present disclosure, the head chamber of the first hydraulic cylinder may be hydraulically connected to the rod chamber of the second hydraulic cylinder via a third check valve which is configured to allow hydraulic flow into the head chamber of the first hydraulic cylinder, and the head chamber of the second hydraulic cylinder may be hydraulically connected to the rod chamber of the first hydraulic cylinder via a fourth check valve which is configured to allow hydraulic flow into the head chamber of the second hydraulic cylinder.

According to another aspect of the present disclosure, the articulated work vehicle may also include a hydraulic valve. The hydraulic valve may be configured to allow hydraulic flow from a hydraulic pump to the head chamber of the first hydraulic cylinder and the rod chamber of the second hydraulic in a first mode. The hydraulic valve may be configured to allow hydraulic flow from the hydraulic pump to the head chamber of the second hydraulic cylinder and the rod chamber of the first hydraulic in a second mode.

According to another aspect of the present disclosure, the articulated work vehicle may also include a hydraulic reservoir. The hydraulic valve may be configured to allow hydraulic flow from the rod chamber of the first hydraulic cylinder and the head chamber of the second hydraulic cylinder to the hydraulic reservoir in the first mode, The hydraulic valve may be configured to allow hydraulic flow from the rod chamber of the second hydraulic cylinder and the head chamber of the first hydraulic to the hydraulic reservoir in the second mode.

According to another aspect of the present disclosure, the first flow restrictor and the third check valve may be integral to a flow control valve. The flow control valve may allow hydraulic flow in a first direction at a first hydraulic flow resistance. The flow control valve may allow hydraulic flow in a second direction at a second hydraulic flow resistance greater than the first resistance According to another aspect of the present disclosure, the hydraulic source may be a return line to a hydraulic reservoir.

According to another aspect of the present disclosure, the average operating pressure of the hydraulic source may be below 200 psi.

According to another aspect of the present disclosure, the first flow restrictor may have a hydraulic flow resistance less than that of an orifice 0.16 inches in diameter.

According to another aspect of the present disclosure, the first flow restrictor may have a hydraulic flow resistance less than that of an orifice with a diameter of 5% of a diameter of the head chamber of the first hydraulic cylinder.

According to another aspect of the present disclosure, the first flow restrictor may have a hydraulic flow resistance between that of an orifice with a diameter of 1.7% of a diameter of the head chamber of the first hydraulic cylinder and an orifice with a diameter of 4.0% of the diameter of the head chamber of the first hydraulic cylinder.

According to another aspect of the present disclosure, the first flow restrictor may be configured to provide a variable resistance.

According to another aspect of the present disclosure, an articulated work vehicle with a regenerative hydraulic circuit may comprise a front chassis, a rear chassis, a first hydraulic cylinder, a second hydraulic cylinder, an articulation joint, and a hydraulic valve. The first hydraulic cylinder may comprise a head chamber and a rod chamber. The first hydraulic cylinder may be pivotally connected to the front chassis and pivotally connected to the rear chassis. The second hydraulic cylinder may comprise a head chamber and a rod chamber. The second hydraulic cylinder may be pivotally connected to the front chassis and pivotally connected to the rear chassis. The articulation joint may pivotally connect the front chassis to the rear chassis. The articulation joint may be positioned between the first hydraulic cylinder and the second hydraulic cylinder. The hydraulic valve may comprise a first port, a second port, a third port, and a fourth port. The first port may be hydraulically connected to the head chamber of the first hydraulic cylinder. The first port may also be hydraulically connected to the rod chamber of the second hydraulic cylinder via a first flow restrictor. The second port may be hydraulically connected to the head chamber of the second hydraulic cylinder. The second port may also be hydraulically connected to the rod chamber of the first hydraulic cylinder via a second flow restrictor. The third port may be hydraulically connected to an outlet of a hydraulic pump. The fourth port may be hydraulically connected to a hydraulic reservoir. The fourth port may also be hydraulically connected to the rod chamber of the first hydraulic cylinder by a first check valve configured to allow hydraulic flow into the rod chamber of the first hydraulic cylinder. The fourth port may also be hydraulically connected to the rod chamber of the second hydraulic cylinder by a second check valve configured to allow hydraulic flow into the rod chamber of the second hydraulic cylinder.

According to another aspect of the present disclosure, the head chamber of the first hydraulic cylinder may be hydraulically connected to the rod chamber of the second hydraulic cylinder via a third check valve which is configured to allow hydraulic flow into the head chamber of the first hydraulic cylinder, and the head chamber of the second hydraulic cylinder may be hydraulically connected to the rod chamber of the first hydraulic cylinder via a fourth check valve which is configured to allow hydraulic flow into the head chamber of the second hydraulic cylinder.

According to another aspect of the present disclosure, the fourth port may be hydraulically connected to the hydraulic reservoir via a fifth check valve configured to allow hydraulic flow into the hydraulic reservoir, the first check valve may be hydraulically connected to the fourth port between the fourth port and the fifth check valve, and the second check valve may be hydraulically connected to the fourth port between the fourth port and the fifth check valve.

According to another aspect of the present disclosure, the hydraulic valve may be configured to operate in a first mode and in a second mode. In the first mode, the first port may be hydraulically connected to the third port and the second port may be hydraulically connected to the fourth port. In the second mode, the first port may be hydraulically connected to the fourth port and the second port may be hydraulically connected to the third port.

According to another aspect of the present disclosure, the first flow restrictor and the third check valve may be integral to a flow control valve. The flow control valve may allow hydraulic flow in a first direction at a first hydraulic flow resistance and allow hydraulic flow in a second direction at a second hydraulic flow resistance which is greater than the first resistance.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
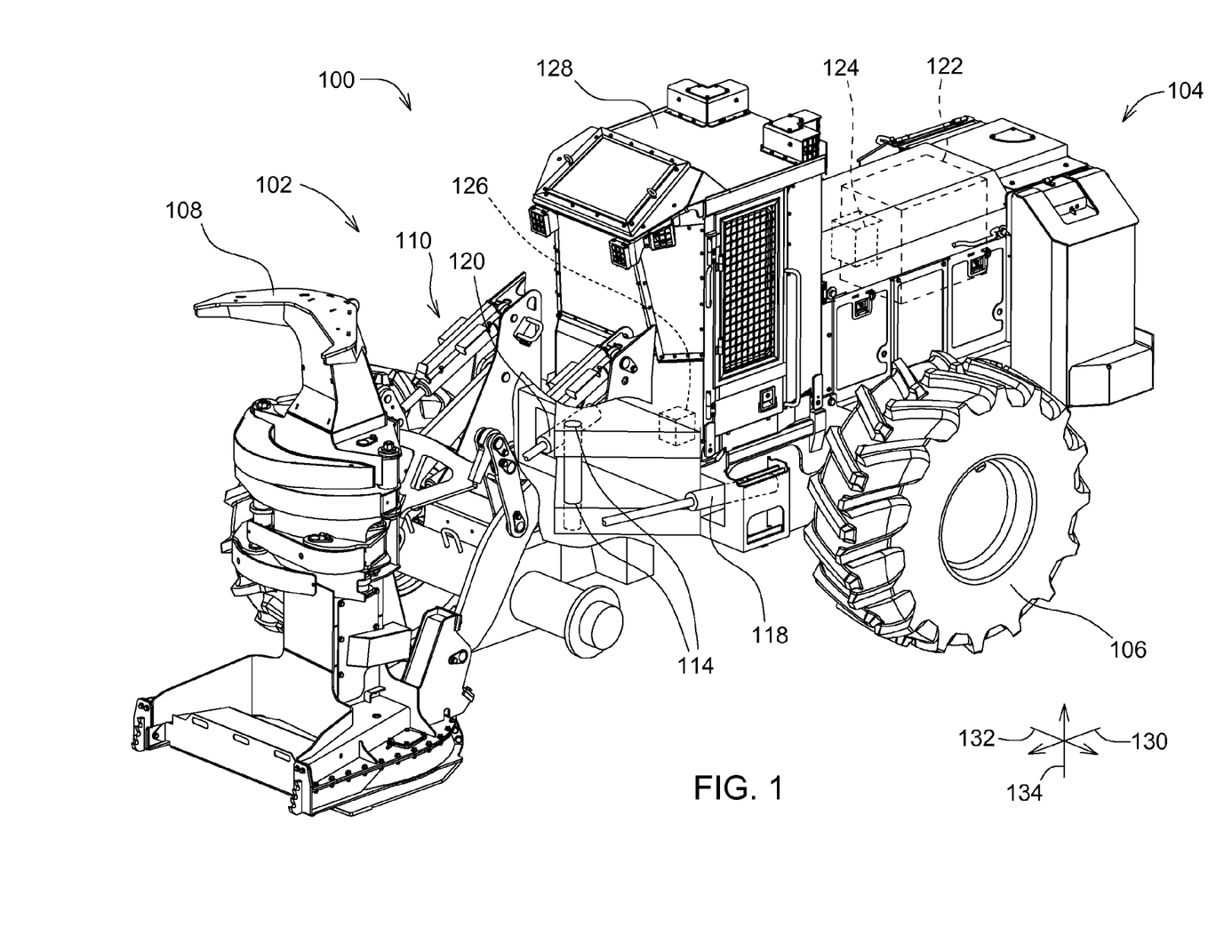
FIG. 1 is a perspective view of a work vehicle with portions removed.

FIG. 1 is a perspective view of work vehicle 100. Work vehicle 100 is illustrated as a wheeled feller buncher, but may be any work vehicle with an articulated frame, such as an articulated dump truck, high speed dozer, motor grader, scraper, skidder, tractor, wheel loader, wheeled feller buncher, or wheeled harvester, to name a few examples. Work vehicle 100 includes an articulated frame comprised of front chassis 102 and rear chassis 104 pivotally connected by articulation joint 114. This arrangement enables front chassis 102 to pivot relative to rear chassis 104 about a vertical axis which traverses both front chassis 102 and rear chassis 104. Work vehicle 100 may be steered by such articulation. For example, the heading of work vehicle 100 will tend to move in the direction at which front chassis 102 is articulated relative to rear chassis 104 when work vehicle 100 is moving forwards. This articulated configuration may provide all the steering capability necessary for work vehicle 100 such that wheels 106 may be pivotally connected to front chassis 102 and rear chassis 104 without being independently steerable. In alternate embodiments, work vehicle 100 may have both an articulated frame which can provide steering and steerable wheels, a configuration which may be found on some motor graders.

As used herein, longitude generally refers to longitudinal direction 130 traversing work vehicle 100 in the fore-aft direction, lateral generally refers to lateral direction 132 traversing work vehicle 100 in the left-right direction, and vertical generally refers to vertical direction 134 traversing work vehicle 100 in the top-bottom direction. As used herein, directions with regard to work vehicle 100 may be referred to with respect to an operator seated within operator station 128: the left of work vehicle 100 is to the left of such an operator, the right of work vehicle 100 is to the right of such an operator, the front or fore of work vehicle 100 is the direction such an operator faces, the rear or aft of work vehicle 100 is behind such an operator, the top of work vehicle 100 is above such an operator, and the bottom of work vehicle 100 is below such an operator.

Front chassis 102 may be located longitudinally fore of articulation joint 114 and may provide a structural attachment point for the foremost two of wheels 106 (not shown in FIG. 1, see FIG. 2), which are attached to front chassis 102, and work tool 108, which connects to the remainder of work vehicle 100 through linkage 110. Rear chassis 104 may be located longitudinally aft of articulation joint 114 and may provide a structural attachment point for the rearmost two of wheels 106. Front chassis 102 and rear chassis 106 together provide structural support for work vehicle 100, providing attachment points for various components as well as strength and rigidity. Front chassis 102 and rear chassis 104 are each weldments comprised of multiple steel pieces joined together by welds. In alternative embodiments, each of front chassis 102 and rear chassis 104 may be formed differently, such as by being integrally formed by casting or hydroforming, or comprised of different materials, such as iron or aluminum, to name but a few examples.

Articulation joint 114 pivotally connects front chassis 102 to rear chassis 104 through vertically aligned top and bottom bearings which, in cooperation with two pins, allow both pivotal motion and the transference of force between front chassis 102 and rear chassis 104. This arrangement may allow work vehicle 100 to steer left and right by articulating front chassis 102 with respect to rear chassis 104 about articulation joint 114.

Front chassis 102 may be articulated relative to rear chassis 104 about articulation joint 114 through the extension and retraction of first hydraulic cylinder 118 and second hydraulic cylinder 120. Each of first hydraulic cylinder 118 and second hydraulic cylinder 120 may receive pressurized hydraulic fluid from hydraulic control valve 126, which may be affixed to, and within, an interior compartment of rear chassis 104. First hydraulic cylinder 118 and second hydraulic cylinder 120 may receive pressurized hydraulic fluid from, and send pressurized fluid to, hydraulic control valve 126. Hydraulic control valve 126 may be a valve manifold with multiple movable spools whose position control the flow of hydraulic fluid to and from first hydraulic cylinder 118, second hydraulic cylinder 120, and other hydraulic circuits, such as those which may actuate linkage 110 or work tool 108.

Hydraulic control valve 126 in turn may receive pressurized hydraulic fluid from hydraulic pump 124 and meter such fluid to first hydraulic cylinder 118, second hydraulic cylinder 120, or other hydraulic functions such as those that may position, orient, or operate work tool 108. Engine 122 may be rotationally coupled to hydraulic pump 124, such as through a gearbox, thereby driving hydraulic pump 124 and providing it with the necessary power to provide pressurized hydraulic fluid to hydraulic control valve 126. Engine 122 may be an internal combustion engine, such as a diesel engine. In alternative embodiments, hydraulic pump 124 may be powered in an alternate manner, such as by an electric motor.

Work vehicle 100 may be operated by an operator positioned in operator station 128. An operator may control work vehicle 100 through any number of various user inputs, such as levers, pedals, switches, and interactive displays. For example, such an operator may issue commands related to the speed of work vehicle 100 through one or more pedals located on the floor of operator station 128 and may issue commands related to the steering of work vehicle 100 through a steering wheel or joystick mounted within operator station 128.

Figure 2:
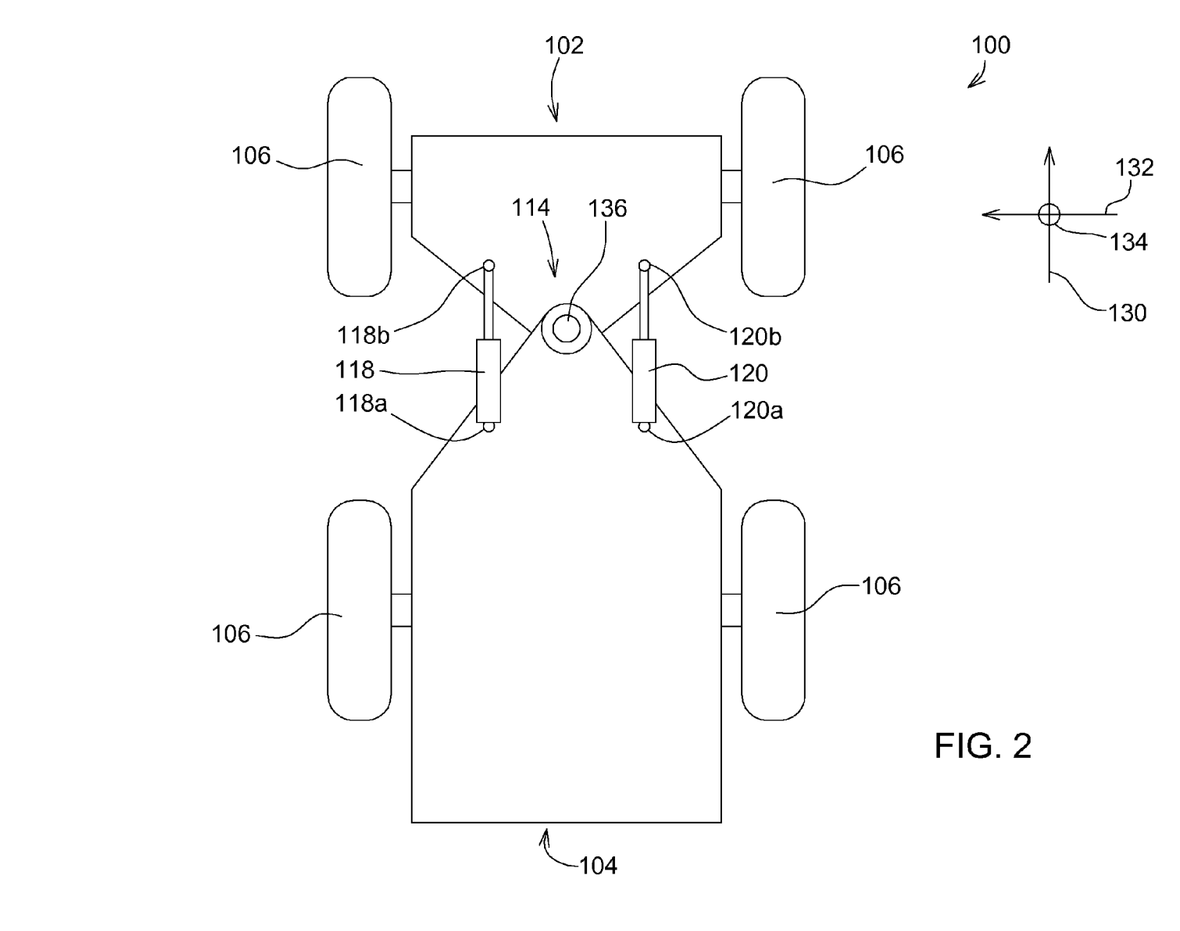
FIG. 2 is an overhead simplified diagrammatic view of the work vehicle.

FIG. 2 is an overhead simplified diagrammatic view of work vehicle 100. The foremost two of wheels 106 are coupled to front chassis 102 and thereby provide rolling support to front chassis 102 on a ground surface. The rearmost two of wheels 106 are coupled to rear chassis 104 and thereby provide rolling support rear chassis 104 on a ground surface. Front chassis 102 is pivotally connected to rear chassis 104 through articulation joint 114. In this embodiment, articulation joint 114 includes two of bearing/pin assembly 136 which consists of a pin inserted into a bearing. Each pin may be affixed to rear chassis 104 while each bearing may have a portion affixed to front chassis 102 and another portion affixed to the pin. In alternate embodiments, the pin and bearing may be affixed to a different combination of front chassis 102 and rear chassis 104 or an alternative structure for pivotally connected front chassis 102 and rear chassis may be utilized, such as pins and bushings. One of bearing/pin assembly 136 may be positioned at an upper portion of articulation joint 114 while the other of bearing/pin assembly 136 may be positioned at a lower portion of articulation joint 114. Each of bearing/pin assembly 136 may be substantially co-axial with the other, but each may be spaced vertically apart to allow for a pivotal connection while still providing a vertical distance that may aid in providing strength and rigidity to work vehicle 100.

First hydraulic cylinder 118 may be positioned on the left side of work vehicle 100, laterally left of articulation joint 114. Second hydraulic cylinder 120 may be positioned on the right side of work vehicle 100, laterally right of articulation joint 114. Articulation joint 114 may thereby be laterally positioned between first hydraulic cylinder 118 and second hydraulic cylinder 120. Head end 118a of first hydraulic cylinder 118 may be pivotally connected to rear chassis 104 while rod end 118b of first hydraulic cylinder 118 may be pivotally connected to front chassis 102. Head end 120a of second hydraulic cylinder 120 may be pivotally connected to rear chassis 104 while rod end 120b of second hydraulic cylinder 120 may be pivotally connected to rear chassis 104. In alternate embodiments, each of head end 118a and head end 120a may be pivotally connected to front chassis 102 while each of rod end 118b and rod end 120b may be pivotally connected to rear chassis 104.

Work vehicle 100 may be articulated by the extension and retraction of first hydraulic cylinder 118 and second hydraulic cylinder 120. Each of first hydraulic cylinder 118, which may also be referred to as the left steering cylinder, and second hydraulic cylinder 120, which may also be referred to as the right steering cylinder, are double-acting and may therefore generate force in both extending and retracting directions. If first hydraulic cylinder 118 is extending and second hydraulic cylinder 120 is retracting, front chassis 102 will tend to pivot laterally right relative to rear chassis 104, substantially about a vertical axis, enabling work vehicle 100 to turn right when moving in a forward direction. Conversely, if first hydraulic cylinder 118 is retracting and second hydraulic cylinder 120 is extending, front chassis 102 will tend to pivot laterally left relative to rear chassis 104, substantially about a vertical axis, enabling work vehicle 100 to turn left when moving in a forward direction. First hydraulic cylinder 118 and second hydraulic cylinder 120, and the hydraulic system actuating these cylinders, are thereby configured to articulate and turn work vehicle 100.

Figure 3:
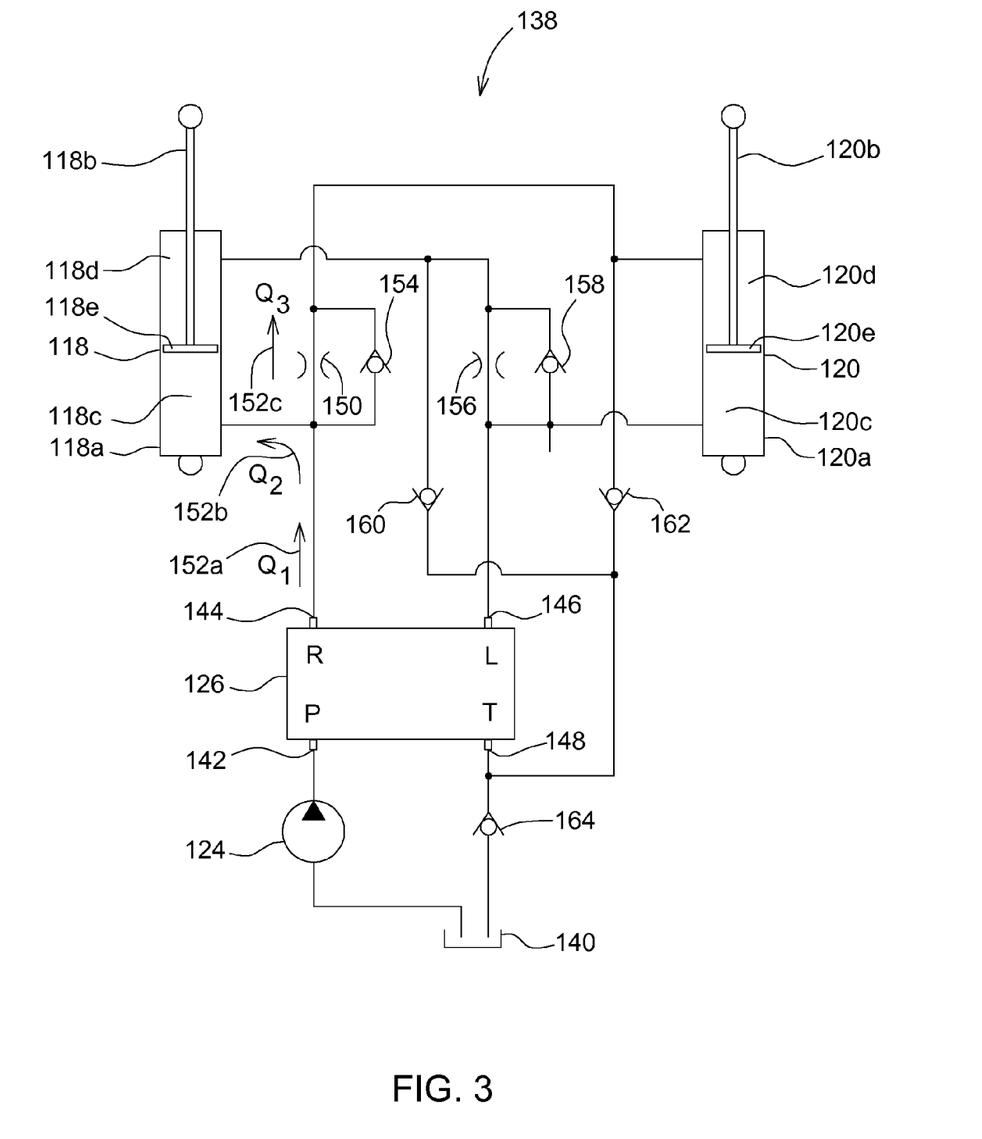
FIG. 3 is a schematic of a regenerative hydraulic system.

FIG. 3 illustrates hydraulic system 138 which may actuate first hydraulic cylinder 118 and second hydraulic cylinder 120. Hydraulic pump 124 may draw hydraulic fluid from hydraulic reservoir 140 and, powered by engine 122 (shown in FIG. 2), provide pressurized hydraulic fluid to first port 142 of hydraulic control valve 126, which may also be referred to as the pump port. Hydraulic reservoir 140 may contain hydraulic fluid at atmospheric pressure or at a pressure above or below atmospheric pressure, depending on the design of work vehicle 100 and the operational state of hydraulic system 138. Hydraulic components, such as hydraulic pump 124 and hydraulic control valve 126, may be hydraulically connected by hydraulic lines or hoses and fittings which provide substantially fluid-tight passages for hydraulic fluid.

Hydraulic control valve 126 receives pressurized hydraulic fluid from hydraulic pump 124 and may direct such fluid to second port 144, which may also be referred to as a right turn port, or third port 146, which may also be referred to as a left turn port. Hydraulic control valve 126 may also direct hydraulic fluid from second port 144 or third port 146 to fourth port 148, which may be referred to as the tank port. Hydraulic control valve 126 may comprise a number of spools, poppets, orifices, and other hydraulic components to control the flow of hydraulic fluid. Hydraulic control valve 126 may also be included in a control valve assembly that includes other ports and components for directing and metering pressurized hydraulic fluid to other functions, such as those that actuate work tool 108 or linkage 110.

First hydraulic cylinder 118 may receive pressurized hydraulic fluid from second port 144 of hydraulic control valve 126 at head chamber 118c, and may receive pressurized hydraulic fluid from third port 146 at rod chamber 118d. Head chamber 118c may be located at head end 118a of first hydraulic cylinder 118, and may comprise a hollow cylindrical cavity with a fixed diameter and a length dependent upon the position of piston 118e. Rod chamber 118d may be located at rod end 118b of first hydraulic cylinder 118, and may comprise a hollow cylindrical shell cavity with a fixed outer diameter, a fixed inner diameter (i.e., the diameter of the rod), and a length dependent upon the position of piston 118e.

Second hydraulic cylinder 120 may receive pressurized hydraulic fluid from second port 144 of hydraulic control valve 126 at rod chamber 120d, and may receive pressurized hydraulic fluid from third port 146 at head chamber 120c. Head chamber 120c may be located at head end 120a of second hydraulic cylinder 120, and may comprise a hollow cylindrical cavity with a fixed diameter and a length dependent upon the position of piston 120e. Rod chamber 120d may be located at rod end 120b of second hydraulic cylinder 120, and may comprise a hollow cylindrical shell cavity with a fixed outer diameter, a fixed inner diameter (i.e., the diameter of the rod), and a length dependent upon the position of piston 120e.

Second port 144 may be hydraulically connected to head chamber 118c of first hydraulic cylinder 118 without an intermediate flow restrictor and hydraulically connected to rod chamber 120d of second hydraulic cylinder 120 through first flow restrictor 150. This configuration may split first flow 152a coming from second port 144 into two separate flows, second flow 152b and third flow 152c. Second flow 152b may flow into head chamber 118c of first hydraulic cylinder 118, while third flow 152c may flow through first flow restrictor 150 into rod chamber 120d of second hydraulic cylinder 120. First flow restrictor 150 restricts third flow 152c and thereby biases flow from second port 144 toward head chamber 118c of first hydraulic cylinder 118 rather than rod chamber 120d of second hydraulic cylinder 120. The flow rate across first flow restrictor 150 depends on the pressure differential between head chamber 118c of first hydraulic cylinder 118 and rod chamber 120d of second hydraulic cylinder 120. The greater this pressure differential, the greater the flow rate across first flow restrictor 150.

Rod chamber 120d of second hydraulic cylinder 120 may be hydraulically connected to head chamber 118c of first hydraulic cylinder 118 through first check valve 154. First check valve 154 may be configured to permit flow from rod chamber 120d of second hydraulic cylinder 120 into head chamber 118c of first hydraulic cylinder 118 while not permitting flow in the opposite direction. First flow restrictor 150 and first check valve 154 cooperate to allow flow from second port 144 or head chamber 118c of first hydraulic cylinder 118 to rod chamber 120d of second hydraulic cylinder 120 at a first flow resistance and to allow flow from rod chamber 120d of second hydraulic cylinder 120 to second port 144 or head chamber 118c of first hydraulic cylinder 118 at a second flow resistance, where the first flow resistance is greater than the second flow resistance.

Third port 146 may be hydraulically connected to head chamber 120c of second hydraulic cylinder 120 without an intermediate flow restrictor and hydraulically connected to rod chamber 118d of first hydraulic cylinder 118 through second flow restrictor 156. Similar to the arrangement on second port 144, this configuration may split first flow coming from third port 146 into two separate flows, one of which may flow into head chamber 120c of second hydraulic cylinder 120 and the other of which may flow through second flow restrictor 156 into rod chamber 118d of first hydraulic cylinder 118. Second flow restrictor 154 restricts flow into rod chamber 118d of first hydraulic cylinder 118 and thereby biases flow from third port 146 toward head chamber 120c of second hydraulic cylinder 120 rather than rod chamber 118d of first hydraulic cylinder 118. The flow rate across second flow restrictor 156 depends on the pressure differential between head chamber 120c of second hydraulic cylinder 120 and rod chamber 118d of first hydraulic cylinder 118. The greater this pressure differential, the greater the flow rate across second flow restrictor 156.

Rod chamber 118d of first hydraulic cylinder 118 may be hydraulically connected to head chamber 120c of second hydraulic cylinder 120 through second check valve 158. Second check valve 158 may be configured to permit flow from rod chamber 118d of first hydraulic cylinder 118 into head chamber 120c of second hydraulic cylinder 120 while not permitting flow in the opposite direction. Second flow restrictor 156 and second check valve 158 cooperate to allow flow from third port 146 or head chamber 120c of second hydraulic cylinder 120 to rod chamber 118d of first hydraulic cylinder 118 at a first flow resistance and to allow flow from rod chamber 118d of first hydraulic cylinder 118 to third port 146 or head chamber 120c of second hydraulic cylinder 120 at a second flow resistance, where the first flow resistance is greater than the second flow resistance.

In FIG. 3, first flow restrictor 150 and first check valve 154 are diagrammatically represented as separate components, but they may physically consist of either separate components or a single flow control valve which permits flow in a first direction at a first resistance and permits flow in a second direction at a second resistance greater than the first resistance. For example, certain flow control valves may be comprised of a single poppet or spool which allows flow in a first direction at a first resistance, but which will shift to a more closed position when exposed to flow in a second direction opposite the first direction and thereby allow flow in the second direction at a second resistance which is greater than the first resistance. Similarly, second flow restrictor 156 and second check valve 158 may be either separate components or integrated into a single flow control valve.

In this embodiment, first flow restrictor 150 and second flow restrictor 156 are diagrammatically represented as orifices, but they may physically consist of any of a number of types of flow restrictors. For example, they may be a certain shape or notches built into a flow control valve which resists flow by limiting the effective cross-sectional flow area when closed but which shifts open when exposed to flow in the opposite direction and thereby allows flow at a lower resistance. As another example, they may be hydraulic lines or fittings with reduced effective cross-sectional flow areas, hydraulic lines of increased length, or some combination thereof. As another example, they may be relief valves which provide a flow restriction which varies from a high flow restriction or complete blockage at a low pressure to a low restriction at a higher pressure.

In this embodiment, first flow restrictor 150 and second flow restrictor 156 are fixed diameter orifices, but in alternate embodiments they may be variable diameter orifices. For example, they may physically consist of a passage or valve with an effective cross-sectional flow area which may be increased or decreased, such as by a physical adjustment (e.g., rotating a screw) or by an electronic adjustment (e.g., energizing a solenoid). Variable diameter orifices may be used to compensate for the effects of temperature on hydraulic system 138, or may be used to change the behavior of hydraulic system 138 in certain circumstances. For example, to enable reduced articulation cycle times (i.e., increase the articulation velocity), alternative embodiments may utilize solenoid-actuated valves so that the resistance of first flow restrictor 150 and second flow restrictor 156 may be increased if the load opposing articulation is low and decreased if the load opposing articulation is high.

Fourth port 148, hydraulic reservoir 140, rod chamber 118d of first hydraulic cylinder, and rod chamber 120d of second hydraulic cylinder 120 may be hydraulically interconnected. Rod chamber 118d of first hydraulic cylinder 118 may be hydraulically connected to fourth port 148, hydraulic reservoir 140, and rod chamber 120d of second hydraulic cylinder 120 through third check valve 160. Third check valve 160 may be configured to allow flow into rod chamber 118d of first hydraulic cylinder 118 but to block flow in the opposite direction. Rod chamber 120d of second hydraulic cylinder 120 may be hydraulically connected to fourth port 148, hydraulic reservoir 140, and rod chamber 118d of first hydraulic cylinder 118 through fourth check valve 162. Fourth check valve 162 may be configured to allow flow into rod chamber 120d of second hydraulic cylinder 120 but to block flow in the opposite direction. Hydraulic reservoir 140 may be hydraulically connected to fourth port 148, rod chamber 118d of first hydraulic cylinder 118, and rod chamber 120d of second hydraulic cylinder 120 through fifth check valve 164. Fifth check valve 164 may be configured to allow flow into hydraulic reservoir 140 but to block flow in the opposite direction. Third check valve 160 and fourth check valve 162 cooperate to permit flow from fourth port 148 to rod chamber 118d of first hydraulic cylinder 118 or rod chamber 120d of second hydraulic cylinder 120, but prevent flow in the reverse direction.

Hydraulic system 138 may be used to steer work vehicle 100. Work vehicle 100 may receive a command from an operator in operator station 128 indicative of a desired steering velocity or angle, for example through a wheel or lever actuated by the operator. This command may be communicated to hydraulic control valve 126 via electrical signals or hydraulic signals. For example, an operator may rotate a steering wheel, which in turn directs pressurized hydraulic fluid to hydraulic control valve 126 through pilot lines which may shift a spool within hydraulic control valve 126 to steer work vehicle 100. As another example, an operator may actuate a joystick which sends an electrical signal to a controller, and the controller may then send an electrical signal to an electrohydraulic pilot valve which directs pressurized hydraulic fluid to hydraulic control valve 126 to shift a spool and thereby steer work vehicle 100. This electrohydraulic pilot valve may be included within hydraulic control valve 126.

If work vehicle 100 receives a command from an operator to turn right, hydraulic control valve 126 may actuated to operate in a first mode in which it allows hydraulic fluid to flow from first port 142 to second port 144 and from third port 146 to fourth port 148. This arrangement directs hydraulic fluid from hydraulic pump 124 to head chamber 118c of first hydraulic cylinder 118 and rod chamber 120d of second hydraulic cylinder 120, and may thereby generate a pressure in these chambers. This arrangement also allows hydraulic fluid from rod chamber 118d of first hydraulic cylinder 118 and head chamber 120c of second hydraulic cylinder 120 to flow to hydraulic reservoir 140, and may thereby reduce the pressure in these chambers. This may create a pressure differential across piston 118e of first hydraulic cylinder 118, tending to cause first hydraulic cylinder 118 to extend, and create a pressure differential across piston 120e of second hydraulic cylinder 120 tending to cause second hydraulic cylinder 120 to retract. The extension of first hydraulic cylinder 118 and the retraction of second hydraulic cylinder 120 will articulate front chassis 102 to the right, substantially about a vertical axis, relative to rear chassis 104, causing work vehicle 100 to turn right if it is moving in a forward direction.

As first hydraulic cylinder 118 extends, hydraulic fluid enters head chamber 118c of first hydraulic cylinder 118 and exits rod chamber 118d of first hydraulic cylinder 118 to make up for the volume added and lost, respectively, by the extension of first hydraulic cylinder 118. Hydraulic fluid may enter head chamber 118c of first hydraulic cylinder 118 from second port 144. Hydraulic fluid may exit rod chamber 118d of first hydraulic cylinder 118 through second flow restrictor 156 and second check valve 158, and continue on to head chamber 120c of second hydraulic cylinder 120 or hydraulic reservoir 140 (through second port 144 and fourth port 148).

As second hydraulic cylinder 120 retracts, hydraulic fluid enters rod chamber 120d of second hydraulic cylinder 120 and exits head chamber 120c of second hydraulic cylinder 120. Hydraulic fluid may enter rod chamber 120d of second hydraulic cylinder 120 from second port 144 through first flow restrictor 150 or from fourth port 148 through fourth check valve 162. If first flow restrictor 150 restricts third flow 152c sufficiently, third flow 152c may be insufficient to make up for the volume created in rod chamber 120d of second hydraulic cylinder 120 by the retraction of second hydraulic cylinder 120, causing a pressure drop, or possibly cavitation, in rod chamber 120d of second hydraulic cylinder 120. If the pressure in rod chamber 120d of second hydraulic cylinder 120 drops below that of fourth port 148, hydraulic fluid may flow from fourth port 148 through fourth check valve 162 into rod chamber 120d of second hydraulic cylinder 120. This may create a regenerative effect, where hydraulic fluid exiting rod chamber 118d of first hydraulic cylinder 118 and head chamber 120c of second hydraulic cylinder 120 due to the rightward articulation enters third port 146 of hydraulic control valve 126, exits fourth port 148, and flows to rod chamber 120d of second hydraulic cylinder 120 instead of to hydraulic reservoir 140. This regenerative flow may allow work vehicle 100 to articulate faster than it would if hydraulic pump 124 were required to provide the hydraulic fluid to fill all the new volume created in both head chamber 118c of first hydraulic cylinder 118 and rod chamber 120d of second hydraulic cylinder 120 during a rightward articulation. Cycle times, for example the time it takes to articulate from a maximum leftward articulation to a maximum rightward articulation, may thereby be shortened compared to a non-regenerative hydraulic circuit using the same size of hydraulic pump 124. Alternatively, cycle times may be maintained compared to a non-regenerative hydraulic circuit using a larger size of hydraulic pump 124.

A similar process is followed when work vehicle 100 receives a command from an operator to articulate work vehicle 100 left. Hydraulic control valve 126 may be actuated to operate in a second mode in which it allows fluid to flow from first port 142 to third port 146 and from second port 144 to fourth port 148. This arrangement directs hydraulic fluid from hydraulic pump 124 to head chamber 120c of second hydraulic cylinder 120 and rod chamber 118d of first hydraulic cylinder 118, and may thereby generate a pressure in these chambers. This arrangement also allows hydraulic fluid from rod chamber 120d of second hydraulic cylinder 120 and head chamber 118c of first hydraulic cylinder 118 to flow to hydraulic reservoir 140, and may thereby reduce the pressure in these chambers. This may create a pressure differential across piston 118e of first hydraulic cylinder 118, tending to cause first hydraulic cylinder 118 to retract, and create a pressure differential across piston 120e of second hydraulic cylinder 120 tending to cause second hydraulic cylinder 120 to extend. The retraction of first hydraulic cylinder 118 and the extension of second hydraulic cylinder 120 will articulate front chassis 102 to the left, substantially about a vertical axis, relative to rear chassis 104, causing work vehicle 100 to turn left if it is moving in a forward direction.

As second hydraulic cylinder 120 extends, hydraulic fluid enters head chamber 120c of second hydraulic cylinder 120 and exits rod chamber 120d of second hydraulic cylinder 120 to make up for the volume added and lost, respectively, by the extension of second hydraulic cylinder 120. Hydraulic fluid may enter head chamber 120c of second hydraulic cylinder 120 from third port 146. Hydraulic fluid may exit rod chamber 120d of second hydraulic cylinder 120 through first flow restrictor 150 and first check valve 154, and continue on to head chamber 118c of first hydraulic cylinder 118 and hydraulic reservoir 140 (through second port 144 and fourth port 148).

As first hydraulic cylinder 118 retracts, hydraulic fluid enters rod chamber 118d of first hydraulic cylinder 118 and exits head chamber 118c of first hydraulic cylinder 118. Hydraulic fluid may enter rod chamber 118d of first hydraulic cylinder 118 from third port 148 through second flow restrictor 156 or from fourth port 148 through third check valve 160. If second flow restrictor 156 restricts flow sufficiently, the flow through second flow restrictor 156 may be insufficient to make up for the volume created in rod chamber 118d of first hydraulic cylinder 118 by the retraction of first hydraulic cylinder 118, causing a pressure drop, or possibly cavitation, in rod chamber 118d of first hydraulic cylinder 118. If the pressure in rod chamber 118d of first hydraulic cylinder 118 drops below that of fourth port 148, hydraulic fluid may flow from fourth port 148 through third check valve 160 into rod chamber 118d of first hydraulic cylinder 118. This may create a regenerative effect, where hydraulic fluid exiting rod chamber 120d of second hydraulic cylinder 120 and head chamber 118c of first hydraulic cylinder 118 due to the leftward articulation enters second port 144 of hydraulic control valve 126, exits fourth port 148, and flows to rod chamber 118d of first hydraulic cylinder 118 instead of to hydraulic reservoir 140. This regenerative flow may allow work vehicle 100 to articulate faster than it would if hydraulic pump 124 were required to provide the hydraulic fluid to fill all the new volume created in both head chamber 118c of first hydraulic cylinder 118 and rod chamber 120d of second hydraulic cylinder 120 during a leftward articulation.

Fifth check valve 164, which is configured to allow hydraulic fluid to flow into hydraulic reservoir 140 but to block hydraulic fluid from flowing out of hydraulic reservoir 140, may be included when it is not desirable for fluid to be drawn from hydraulic reservoir 140 into rod chamber 118d of first hydraulic cylinder 118 or rod chamber 120d of second hydraulic cylinder 120. Fifth check valve 164 may be hydraulically positioned downstream of fourth port 148 and the hydraulic connection points for third check valve 160 and fourth check valve 162. Third check valve 160 is thereby hydraulically connected to fourth port 148 between fourth port 148 and fifth check valve 164. Fourth check valve 162 is thereby hydraulically connected to fourth port 148 between fourth port 148 and fifth check valve 164. In alternative embodiments, fifth check valve 164 may not be present and fluid may be drawn from hydraulic reservoir 140 into rod chamber 118d of first hydraulic cylinder 118 and rod chamber 120d of second hydraulic cylinder 120.

In the embodiment illustrated in FIG. 3, rod chamber 118d of first hydraulic cylinder 118 and rod chamber 120d of second hydraulic cylinder 120 each may receive hydraulic fluid leaving fourth port 148 and traveling to hydraulic reservoir 140 through fifth check valve 164. This configuration thereby utilizes a return line to hydraulic reservoir 140 as the hydraulic source. In alternative embodiments, a different hydraulic source may be used for each of these rod chambers. The hydraulic source may be, for example, a hydraulic reservoir (either pressurized or unpressurized), a return line to hydraulic reservoir 140 from another hydraulic circuit or function such as one which actuates work tool 108, or a low pressure circuit such as one with an average operating pressure below 200 pounds per square inch (psi).

When the load opposing an articulation of front chassis 102 relative to rear chassis 104 is greater than the force produced by one of first hydraulic cylinder 118 and second hydraulic cylinder 120 under the maximum pressure from hydraulic pump 124, the articulation speed of work vehicle 100 may slow. For example, when front chassis 102 articulates right relative to rear chassis 104, first hydraulic cylinder 118 extends and second hydraulic cylinder 120 retracts simultaneously as they are both pivotally connected to front chassis 102 and rear chassis 104. However, first flow restrictor 150 restricts third flow 152c, and thereby biases first flow 152a toward second flow 152b and head chamber 118c of first hydraulic cylinder 118. This biasing may provide sufficient flow into head chamber 118c of first hydraulic cylinder 118 to generate a pressure and a force in the extending direction for first hydraulic cylinder 118, but it may leave insufficient flow into rod chamber 120d of second hydraulic cylinder 120 to make up for the volume added by the retraction of second hydraulic cylinder 120. Without sufficient flow through first flow restrictor 150, the pressure within rod chamber 120d of second hydraulic cylinder 120 may fall to that of fourth port 148 and second hydraulic cylinder 120 may not generate a force in the retracting direction to aid in the articulation of front chassis 102 right relative to rear chassis 104. The articulation speed for work vehicle 100 may then slow as first hydraulic cylinder 118 fails to generate sufficient force to overcome the load opposing articulation. As the speed of articulation falls, third flow 152c may become sufficient to make up for the volume added by the refraction of second hydraulic cylinder 120, pressure within rod chamber 120d of second hydraulic cylinder 120 may rise, and second hydraulic cylinder 120 may generate a force in the retracting direction tending to articulate work vehicle to the right. The articulation speed of work vehicle 100 may reach an equilibrium rate at which third flow 152c is sufficient to maintain the necessary pressure in rod chamber 120d of second hydraulic cylinder 120 to overcome the load opposing articulation. Hydraulic system 138 may thereby be configured, depending on the restrictiveness of first flow restrictor 150 and second flow restrictor 156, to provide an articulation speed which is load dependent.

Figure 4:
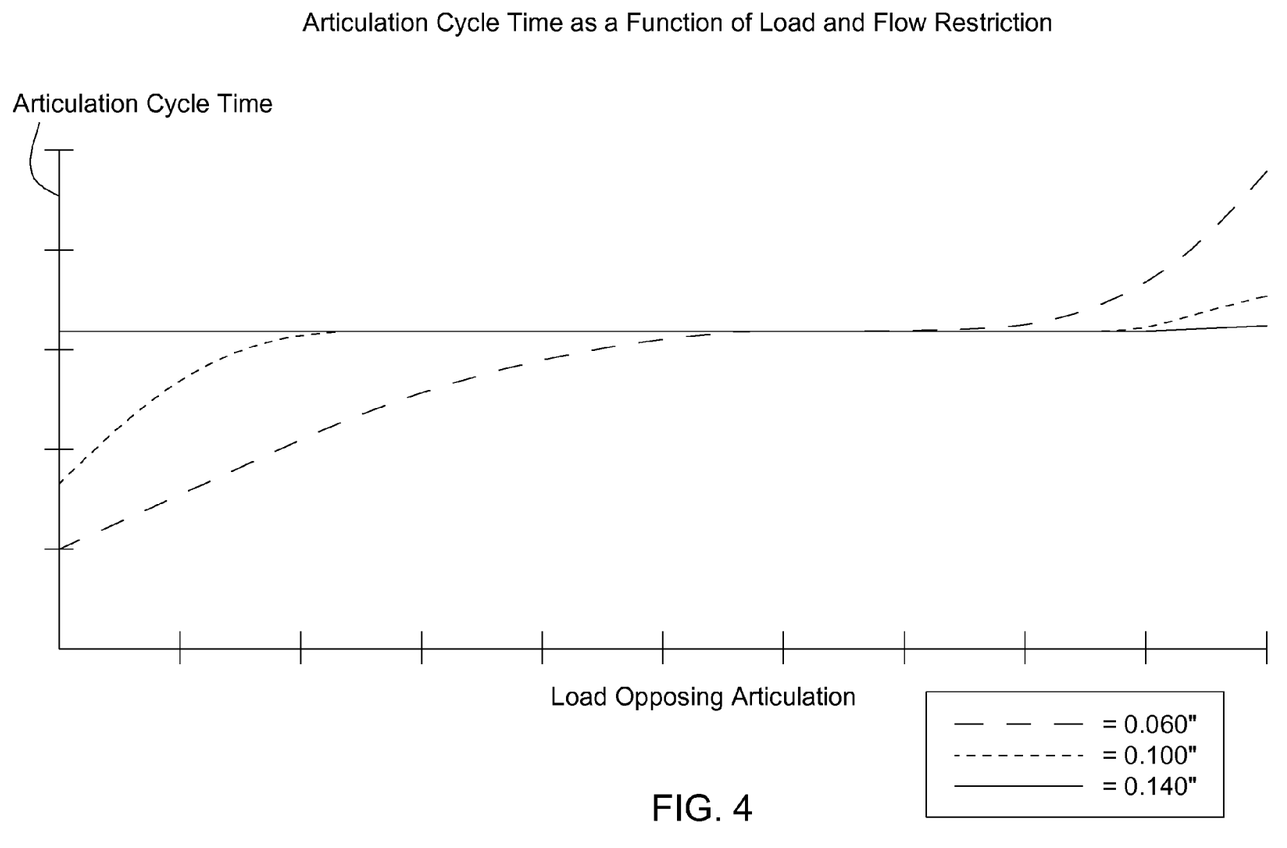
FIG. 4 is a graph depicting articulation cycle time based on a load opposing articulation and a flow restriction.

FIG. 4 is a graph depicting articulation cycle time as a function of the load opposing articulation and the flow restriction for work vehicle 100. The x-axis represents the load opposing articulation of work vehicle 100. Although expressed as a load here, the concept of the resistance to articulation may alternatively be expressed as the torque resisting articulation or the torque necessary from first hydraulic cylinder 118 and second hydraulic cylinder 120 to articulate work vehicle 100. The y-axis represents the cycle time for an articulation from the leftmost articulation position of front chassis 102 relative to rear chassis 104 to the rightmost articulation position of front chassis 102 relative to rear chassis 104. FIG. 4 includes three different values for each of first flow restrictor 150 and second flow restrictor 156: the solid line is for a hydraulic flow resistance equivalent to that of a 0.140 inch diameter orifice, the short dashed line is for a hydraulic flow resistance equivalent to that of a 0.100 inch diameter orifice, and the long dashed line is for a hydraulic flow resistance equivalent to that of a 0.060 inch diameter orifice.

FIG. 4 illustrates that as the hydraulic flow resistance of first flow restrictor 150 and second flow restrictor 156 increases, the articulation cycle time diminishes under low loads but increases under high loads. As the hydraulic flow resistance of first flow restrictor 150 and second flow restrictor 156 increases, hydraulic flow from hydraulic control valve 126 is further biased towards the head chamber of the extending cylinder and away from the rod chamber of the retracting cylinder. Under low loads, this biasing shortens cycle times as the limited flow from hydraulic pump 124 can be directed in large part towards the head chamber of the extending cylinder and regenerative flow can fill the rod chamber of the retracting cylinder. Under high loads, this biasing lengthens cycle times as regenerative flow cannot be used to fill as much of the rod chamber of the retracting cylinder, as pressure is necessary in the rod chamber to articulate the work vehicle, and such volume must instead be filled by hydraulic pump 124 through a flow restrictor with an increased flow resistance. If hydraulic pump 124 or hydraulic control valve 126 have a maximum pressure, the flow rate into the rod chamber of the retracting cylinder is limited to the flow rate through the flow restrictor with a pressure differential equal to the difference between that maximum pressure and the necessary pressure in the rod chamber to cause articulation. The flow rate through the flow restrictor therefore diminishes as the necessary pressure in the rod chamber approaches the maximum system pressure.

In FIG. 4, three embodiments are graphed with three different resistances for the first flow restrictor and the second flow restrictor: a hydraulic flow resistance equivalent to that of a 0.140 inch diameter orifice, a hydraulic flow resistance equivalent to that of a 0.100 inch diameter orifice, and a hydraulic flow resistance equivalent to that of a 0.060 inch diameter orifice. Head chamber 118c of first hydraulic cylinder 118 and head chamber 120c of second hydraulic cylinder 120 are each approximately 3.5 inches in diameter, so the three resistances in the embodiment in FIG. 4 are equivalent to an orifice with a diameter of approximately 4%, 2.9%, and 1.7% of the diameter of these head chambers. Alternative embodiments may involve a wider range of resistance for first flow restrictor 150 and second flow restrictor 156.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An articulated work vehicle with a regenerative hydraulic circuit, comprising:
   a front chassis;
   a rear chassis;
   a first hydraulic cylinder comprising a head chamber and a rod chamber, the first hydraulic cylinder pivotally connected to the front chassis and pivotally connected to the rear chassis;
   a second hydraulic cylinder comprising a head chamber and a rod chamber, the second hydraulic cylinder pivotally connected to the front chassis and pivotally connected to the rear chassis, the rod chamber of the second hydraulic cylinder hydraulically connected to the head chamber of the first hydraulic cylinder via a flow restrictor, the rod chamber of the second hydraulic cylinder hydraulically connected to a hydraulic source via a check valve configured to allow hydraulic flow into the rod chamber of the second hydraulic cylinder; and
   an articulation joint pivotally connecting the front chassis to the rear chassis, the articulation joint positioned between the first hydraulic cylinder and the second hydraulic cylinder.

2. The articulated work vehicle of claim 1, wherein:
   the flow restrictor is a first flow restrictor;
   the check valve is a first check valve;
   the rod chamber of the first hydraulic cylinder is hydraulically connected to the head chamber of the second hydraulic cylinder via a second flow restrictor; and
   the rod chamber of the first hydraulic cylinder is hydraulically connected to the hydraulic source via a second check valve configured to allow hydraulic flow into the rod chamber of the first hydraulic cylinder.

3. The articulated work vehicle of claim 2, wherein:
   the head chamber of the first hydraulic cylinder is hydraulically connected to the rod chamber of the second hydraulic cylinder via a third check valve configured to allow hydraulic flow into the head chamber of the first hydraulic cylinder; and
   the head chamber of the second hydraulic cylinder is hydraulically connected to the rod chamber of the first hydraulic cylinder via a fourth check valve configured to allow hydraulic flow into the head chamber of the second hydraulic cylinder.

4. The articulated work vehicle of claim 3, further comprising a hydraulic valve, wherein the hydraulic valve is configured to allow hydraulic flow from a hydraulic pump to the head chamber of the first hydraulic cylinder and the rod chamber of the second hydraulic in a first mode and the hydraulic valve is configured to allow hydraulic flow from the hydraulic pump to the head chamber of the second hydraulic cylinder and the rod chamber of the first hydraulic in a second mode.

5. The articulated work vehicle of claim 4, further comprising a hydraulic reservoir, wherein the hydraulic valve is configured to allow hydraulic flow from the rod chamber of the first hydraulic cylinder and the head chamber of the second hydraulic cylinder to the hydraulic reservoir in the first mode and the hydraulic valve is configured to allow hydraulic flow from the rod chamber of the second hydraulic cylinder and the head chamber of the first hydraulic to the hydraulic reservoir in the second mode.

6. The articulated work vehicle of claim 3, wherein the first flow restrictor and the third check valve are integral to a flow control valve, the flow control valve allows hydraulic flow in a first direction at a first hydraulic flow resistance, and the flow control valve allows hydraulic flow in a second direction at a second hydraulic flow resistance greater than the first resistance.

7. The articulated work vehicle of claim 1, wherein the hydraulic source is a return line to a hydraulic reservoir.

8. The articulated work vehicle of claim 1, wherein an average operating pressure of the hydraulic source is below 200 psi.

9. The articulated work vehicle of claim 1, wherein the flow restrictor has a hydraulic flow resistance less than that of an orifice 0.16 inches in diameter.

10. The articulated work vehicle of claim 1, wherein the flow restrictor has a hydraulic flow resistance less than that of an orifice with a diameter of 5% of a diameter of the head chamber of the first hydraulic cylinder.

11. The articulated work vehicle of claim 1, wherein the flow restrictor has a hydraulic flow resistance between that of an orifice with a diameter of 1.7% of a diameter of the head chamber of the first hydraulic cylinder and an orifice with a diameter of 4.0% of the diameter of the head chamber of the first hydraulic cylinder.

12. The articulated work vehicle of claim 1, wherein the flow restrictor is configured to provide a variable resistance.

13. An articulated work vehicle with a regenerative hydraulic circuit, comprising:
a front chassis;
a rear chassis;
a first hydraulic cylinder comprising a head chamber and a rod chamber, the first hydraulic cylinder pivotally connected to the front chassis and pivotally connected to the rear chassis;
a second hydraulic cylinder comprising a head chamber and a rod chamber, the second hydraulic cylinder pivotally connected to the front chassis and pivotally connected to the rear chassis, the rod chamber of the second hydraulic cylinder hydraulically connected to the head chamber of the first hydraulic cylinder via a first flow restrictor, the head chamber of the second hydraulic cylinder hydraulically connected to the rod chamber of the second hydraulic cylinder via a second flow restrictor;
an articulation joint pivotally connecting the front chassis to the rear chassis, the articulation joint positioned between the first hydraulic cylinder and the second hydraulic cylinder; and
a hydraulic valve comprising:
a first port hydraulically connected to the head chamber of the first hydraulic cylinder, the first port hydraulically connected to the rod chamber of the second hydraulic cylinder via the first flow restrictor;
a second port hydraulically connected to the head chamber of the second hydraulic cylinder, the second port hydraulically connected to the rod chamber of the first hydraulic cylinder via the second flow restrictor;
a third port hydraulically connected to an outlet of a hydraulic pump; and
a fourth port hydraulically connected to a hydraulic reservoir, the fourth port hydraulically connected to the rod chamber of the first hydraulic cylinder by a first check valve configured to allow hydraulic flow into the rod chamber of the first hydraulic cylinder, the fourth port hydraulically connected to the rod chamber of the second hydraulic cylinder by a second check valve configured to allow hydraulic flow into the rod chamber of the second hydraulic cylinder.

14. The articulated work vehicle of claim 13, wherein:
the head chamber of the first hydraulic cylinder is hydraulically connected to the rod chamber of the second hydraulic cylinder via a third check valve configured to allow hydraulic flow into the head chamber of the first hydraulic cylinder; and
the head chamber of the second hydraulic cylinder is hydraulically connected to the rod chamber of the first hydraulic cylinder via a fourth check valve configured to allow hydraulic flow into the head chamber of the second hydraulic cylinder.

15. The articulated work vehicle of claim 13, wherein:
the fourth port is hydraulically connected to the hydraulic reservoir via a fifth check valve configured to allow hydraulic flow into the hydraulic reservoir;
the first check valve is hydraulically connected to the fourth port between the fourth port and the fifth check valve; and
the second check valve is hydraulically connected to the fourth port between the fourth port and the fifth check valve.

16. The articulated work vehicle of claim 13, wherein the hydraulic valve is configured to operate:
in a first mode wherein the first port is hydraulically connected to the third port and the second port is hydraulically connected to the fourth port; and
in a second mode wherein the first port is hydraulically connected to the fourth port and the second port is hydraulically connected to the third port.

17. The articulated work vehicle of claim 14, wherein the first flow restrictor and the third check valve are integral to a flow control valve, the flow control valve allows hydraulic flow in a first direction at a first hydraulic flow resistance, and the flow control valve allows hydraulic flow in a second direction at a second hydraulic flow resistance greater than the first resistance.

18. The articulated work vehicle of claim 13, wherein the first flow restrictor has a hydraulic flow resistance less than that of an orifice with a diameter of 0.16 inches.

19. The articulated work vehicle of claim 13, wherein the first flow restrictor has a hydraulic flow resistance less than that of an orifice with a diameter of 5% of a diameter of the head chamber of the first hydraulic cylinder.

20. The articulated work vehicle of claim 13, wherein each of the first flow restrictor and the second flow restrictor has a hydraulic flow resistance between that of an orifice with a diameter of 1.7% of a diameter of the head chamber of the first hydraulic cylinder and an orifice with a diameter of 4.0% of the diameter of the head chamber of the first hydraulic cylinder.

* * * * *